United States Patent
Nakanishi et al.

(10) Patent No.: US 7,175,933 B2
(45) Date of Patent: Feb. 13, 2007

(54) FUEL CELL SYSTEM AND VEHICLE WITH FUEL CELL SYSTEM MOUNTED THEREON

(75) Inventors: Haruyuki Nakanishi, Susono (JP); Shinichi Matsumoto, Fuji (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 393 days.

(21) Appl. No.: 10/777,659

(22) Filed: Feb. 13, 2004

(65) Prior Publication Data
US 2004/0229093 A1   Nov. 18, 2004

(30) Foreign Application Priority Data
May 13, 2003   (JP)   ............................ 2003-134794

(51) Int. Cl.
*H01M 2/00* (2006.01)
(52) U.S. Cl. ............................ 429/34; 429/32; 429/38; 429/39
(58) Field of Classification Search .................. 429/34, 429/32, 38, 39
See application file for complete search history.

(56) References Cited
U.S. PATENT DOCUMENTS
6,322,914 B1 * 11/2001 Chow et al. .................. 429/13
6,471,195 B2   10/2002 Shimanuki et al.
2001/0010875 A1   8/2001 Katagiri et al.

FOREIGN PATENT DOCUMENTS
| DE | 19902219 C1 | | 7/2000 |
| DE | 19918849 C2 | | 10/2000 |
| EP | 1349225 | * | 10/2003 |
| EP | 1349225 A1 | | 10/2003 |
| JP | 6-89730 | | 3/1994 |
| JP | 8-138692 | | 5/1996 |
| JP | 10-172586 | * | 6/1998 |
| JP | 2000-251908 | | 9/2000 |
| JP | 2001-118596 | * | 4/2001 |

* cited by examiner

*Primary Examiner*—Raymond Alejandro
*Assistant Examiner*—Tony Chuo
(74) *Attorney, Agent, or Firm*—Kenyon & Kenyon LLP (57) ABSTRACT

A fuel cell system of the invention includes outer-conduit water absorbing members that are arranged outside oxidizing gas conduits of respective unit fuel cells, and a changeover mechanism that changes over the status of the outer-conduit water absorbing members between an absorption state in which the outer-conduit water absorbing members absorb moisture in the oxidizing gas conduits and a non-absorption state in which the outer-conduit water absorbing members do not absorb the moisture in the oxidizing gas conduits. Control of this changeover mechanism effectively regulates the moisture level in the oxidizing gas conduits.

20 Claims, 8 Drawing Sheets

FUEL CELL SYSTEM AND VEHICLE WITH FUEL CELL SYSTEM MOUNTED THEREON

BACKGROUND OF THE INVENTION

1. Field of the Invention

The present invention relates to a fuel cell system and a vehicle with the fuel cell system mounted thereon.

2. Description of the Prior Art

A proposed fuel cell system includes fuel cells that generate electric power through electrochemical reactions of oxygen included in an oxidizing gas, which passes through an oxidizing gas conduit provided on a cathode side of each electrolyte membrane in a wet state, and hydrogen included in a gaseous fuel, which passes through a gaseous fuel conduit provided on an anode side of the electrolyte membrane in the wet state, a water absorbing member that is arranged in the middle of the oxidizing gas conduit, and a non-humidified gas inlet that is arranged in the middle of the oxidizing gas conduit to supply a flow of non-humidified oxidizing gas (see FIGS. 1 and 2 in Japanese Patent Laid-Open Gazette No. 6-89730). In the fuel cell system of this prior art structure, addition of the non-humidified oxidizing gas in the middle of the oxidizing gas conduit lowers the partial pressure of the water vapor and accelerates evaporation of the excess moisture. The water absorbing member absorbs condensed water and prevents the oxidizing gas conduit from being clogged by the condensed water.

In the fuel cell system of the prior art structure, the moisture in the oxidizing gas conduit is absorbed by the water absorbing member and is vaporized from the water absorbing member by the flow of non-humidified oxidizing gas to be removed from the oxidizing gas conduits. Even when there is a significantly low level of moisture in the oxidizing gas conduits, the water absorbing member works to absorb the moisture in the oxidizing gas conduit. This undesirably dries the electrolyte membrane, which is supposed to be kept in the wet state.

SUMMARY OF THE INVENTION

By taking into account the drawbacks of the prior art technique discussed above, the object of the invention is to provide a fuel cell system that regulates the moisture level in an oxidizing gas conduit. The object of the invention is also to provide a fuel cell system that keeps a favorable wet state of an electrolyte membrane. The object of the invention is further to provide a vehicle with such a fuel cell system mounted thereon.

In order to attain at least part of the above and the other related objects, the present invention is directed to a fuel cell system including: a fuel cell that generates electric power through electrochemical reactions of oxygen included in an oxidizing gas, which passes through an oxidizing gas conduit provided on a cathode side of an electrolyte membrane in a wet state, and hydrogen included in a gaseous fuel, which passes through a gaseous fuel conduit provided on an anode side of the electrolyte membrane in the wet state; outer-conduit water absorption means that is disposed outside the oxidizing gas conduit and is capable of absorbing moisture; and changeover means that changes over status of the outer-conduit water absorption means between an absorption state of absorbing moisture in the oxidizing gas conduit and a non-absorption state of not absorbing the moisture in the oxidizing gas conduit.

The fuel cell system activates the changeover means to make the outer-conduit water absorption means absorb the moisture in the oxidizing gas conduit and thereby to remove the moisture from the oxidizing gas conduit, while activating the changeover means to prevent the outer-conduit water absorption means from absorbing the moisture in the oxidizing gas conduit and thereby to retain the moisture in the oxidizing gas conduit. This arrangement allows for regulation of the moisture level in the oxidizing gas conduit and thereby keeps the favorable wet state of the electrolyte membrane, which is closely related to the moisture level in the oxidizing gas conduit.

In the fuel cell system of the present invention, the changeover module may change over the status of the outer-conduit water absorbing member between the absorption state, which brings the outer-conduit water absorbing member into contact with an outlet of the oxidizing gas conduit to make the outer-conduit water absorbing member absorb the moisture in the oxidizing gas conduit, and the non-absorption state, which separates the outer-conduit water absorbing member from the outlet of the oxidizing gas conduit to prevent the outer-conduit water absorbing member from absorbing the moisture in the oxidizing gas conduit.

The fuel cell system of the present invention, as one modification, may include a changeover control module that controls the changeover module according to an operating state of the fuel cell. In this modified structure, the fuel cell system may further include an operating state detection module that detects the operating state of the fuel cell. Here, the changeover control module, as one aspect, may control the changeover module to bring the outer-conduit water absorbing member into contact with the outlet of the oxidizing gas conduit when the operating state detection module detects an excess level of the moisture in the oxidizing gas conduit, while controlling the changeover module to separate the outer-conduit water absorbing member from the outlet of the oxidizing gas conduit when the operating state detection module detects a relatively low level of the moisture in the oxidizing gas conduit. The changeover control module, as another aspect, may control the changeover module to bring the outer-conduit water absorbing member into contact with the outlet of the oxidizing gas conduit when the operating state detection module detects a high output level of the fuel cell, while controlling the changeover module to separate the outer-conduit water absorbing member from the outlet of the oxidizing gas conduit when the operating state detection module detects a relatively low output level of the fuel cell.

In the fuel cell system of the present invention, the changeover module may regulate an effective contact area of the outer-conduit water absorbing member with the outlet of the oxidizing gas conduit.

The fuel cell system of the invention may include an inner-conduit water holding member that is disposed at least on a side of an outlet of the oxidizing gas conduit to absorb the moisture in the oxidizing gas conduit, and the outer-conduit water absorbing member may come into contact with the outlet of the oxidizing gas conduit and thereby with the inner-conduit water holding member, so as to absorb the moisture in the oxidizing gas conduit via the inner-conduit water holding member. Here, the inner-conduit water holding member may absorb the moisture by taking advantage of capillary phenomenon.

In the fuel cell system of the invention, the outer-conduit water absorbing member may absorb the moisture by taking advantage of capillary phenomenon.

The fuel cell system of the invention may further include a fuel cell stack including a plurality of the fuel cells laying one upon another, and an oxidizing gas exhaust manifold that joins respective outlets of oxidizing gas conduits formed in the plurality of fuel cells. Here, the outer-conduit water absorbing member may be located in the oxidizing gas exhaust manifold.

The fuel cell system of the invention which includes a fuel cell that generates electric power through electrochemical reactions of an oxidizing gas and a gaseous fuel, which passes through respective gas conduits, may include: an outer-conduit water absorbing member that is disposed outside at least one of the gas conduits, and is capable of absorbing moisture; and a changeover module that changes over status of the outer-conduit water absorbing member between an absorption state of absorbing moisture and a non-absorption state of not absorbing moisture in the at least one gas conduits.

The vehicle of the invention has the fuel cell system of any of the above arrangements mounted thereon. The fuel cell system of any arrangement discussed above regulates the moisture level in the oxidizing gas conduit and thereby keeps the favorable wet state of the electrolyte membrane, which is closely related to the moisture level in the oxidizing gas conduit. The vehicle with this fuel cell system mounted thereon naturally exerts the equivalent functions and effects to those of the fuel cell system discussed above.

DESCRIPTION OF THE PREFERRED EMBODIMENTS

Figure 1:
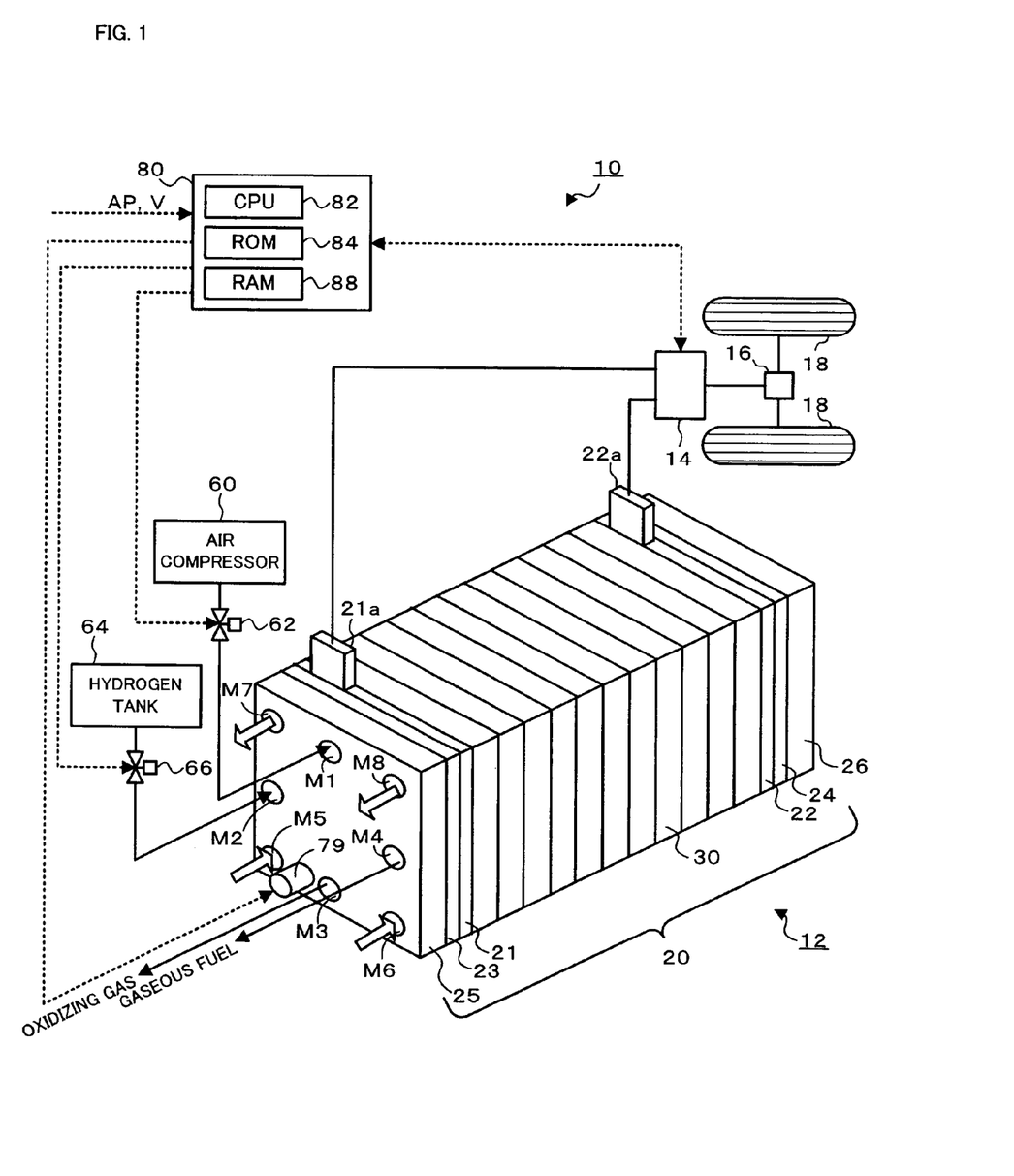
FIG. 1 schematically illustrates the construction of a vehicle with a fuel cell system mounted thereon.
Figure 2:
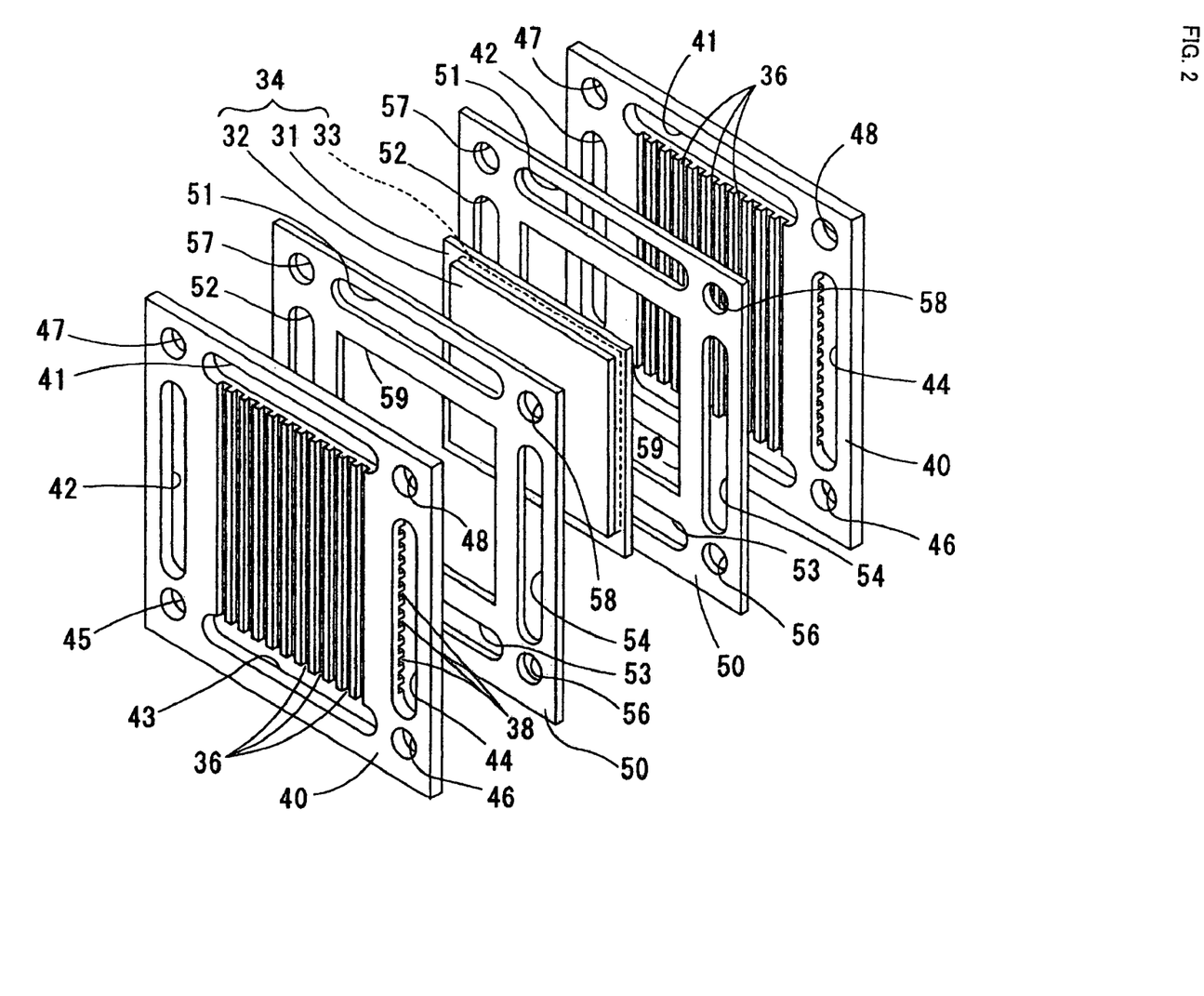
FIG. 2 is a decomposed perspective view showing the structure of a unit fuel cell.
Figure 3:
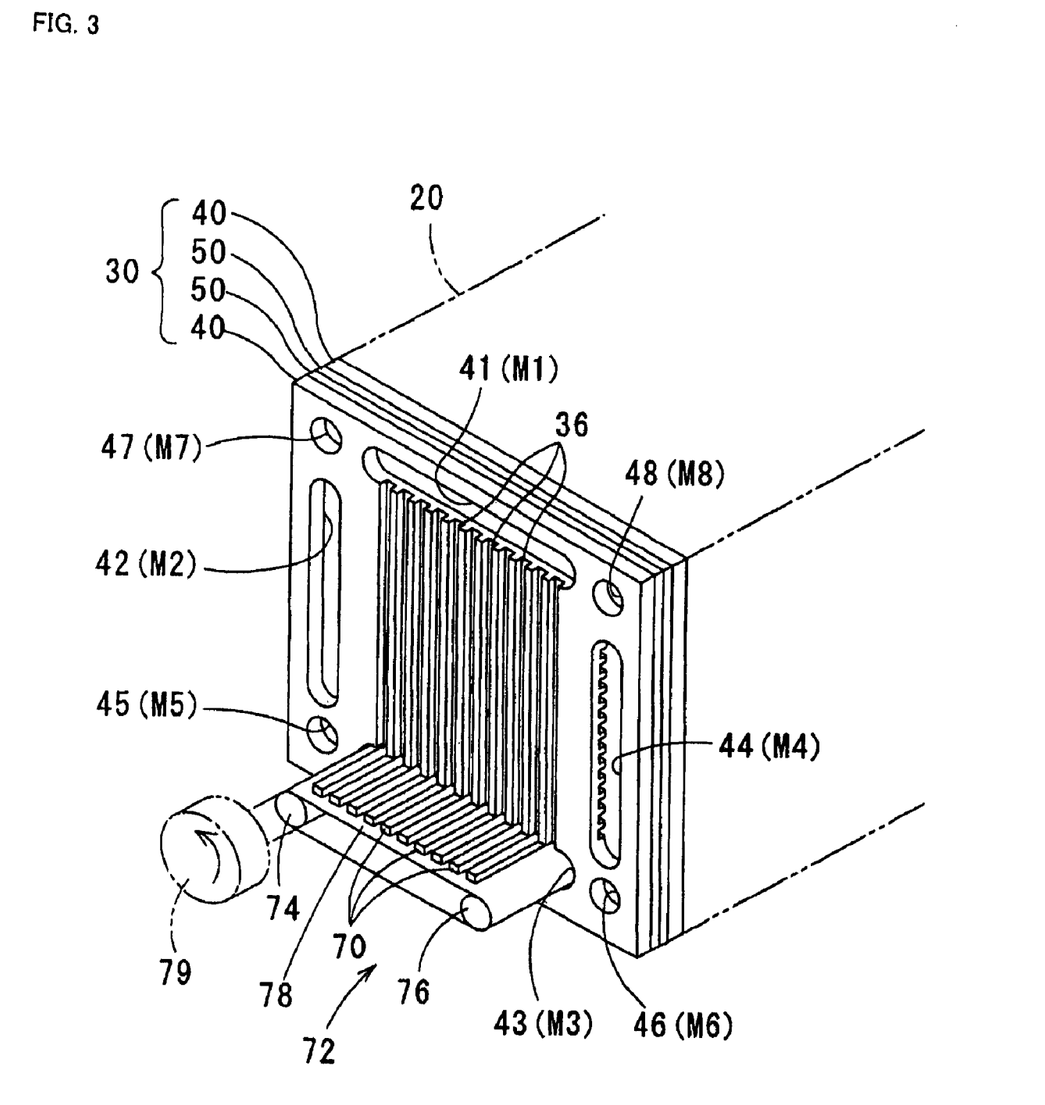
FIG. 3 is a perspective view schematically illustrating a changeover mechanism in one embodiment.
Figure 4:
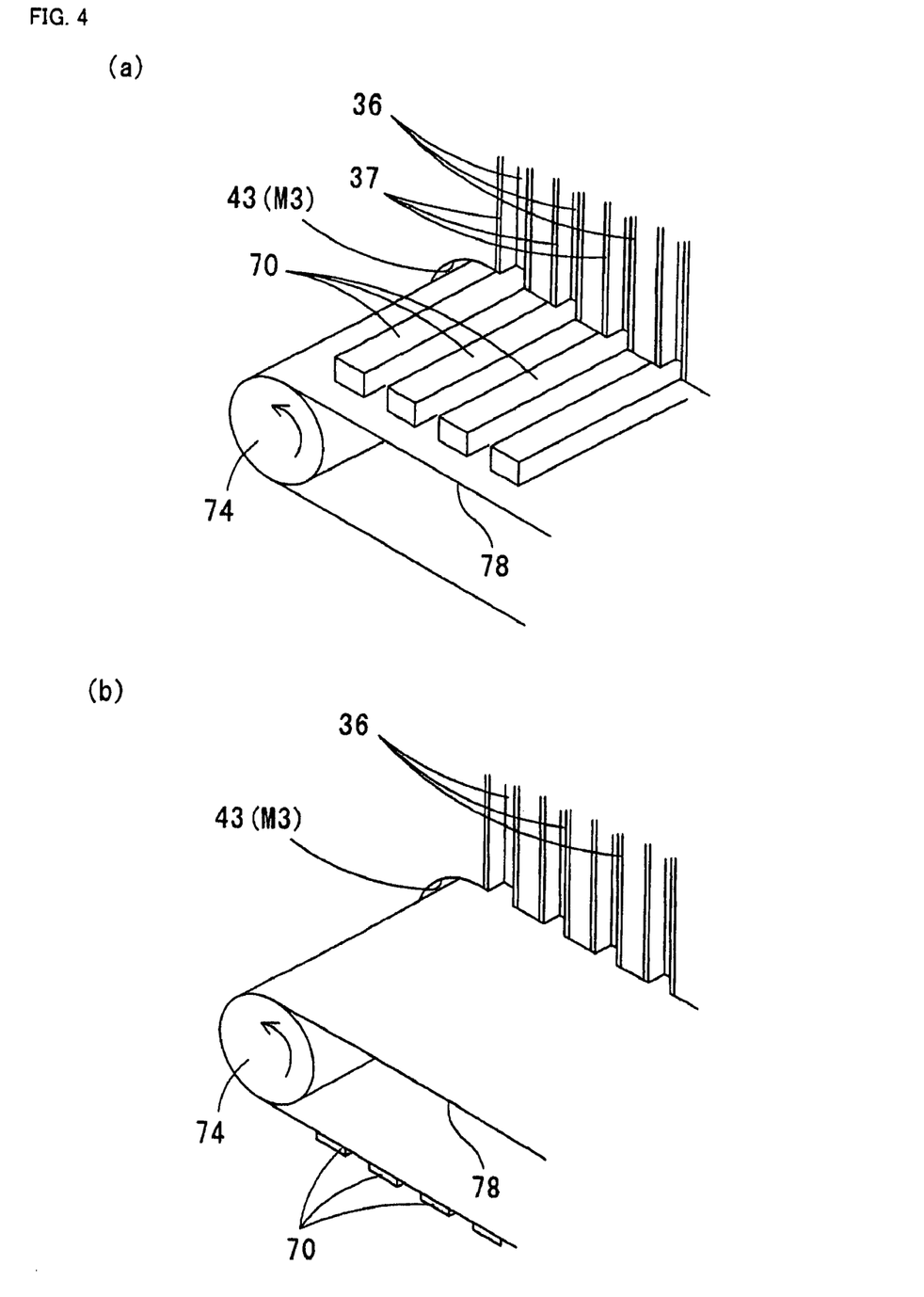
FIG. 4 shows the positional relation between the outer-conduit water absorbing members and oxidizing gas conduits.
Figure 5:
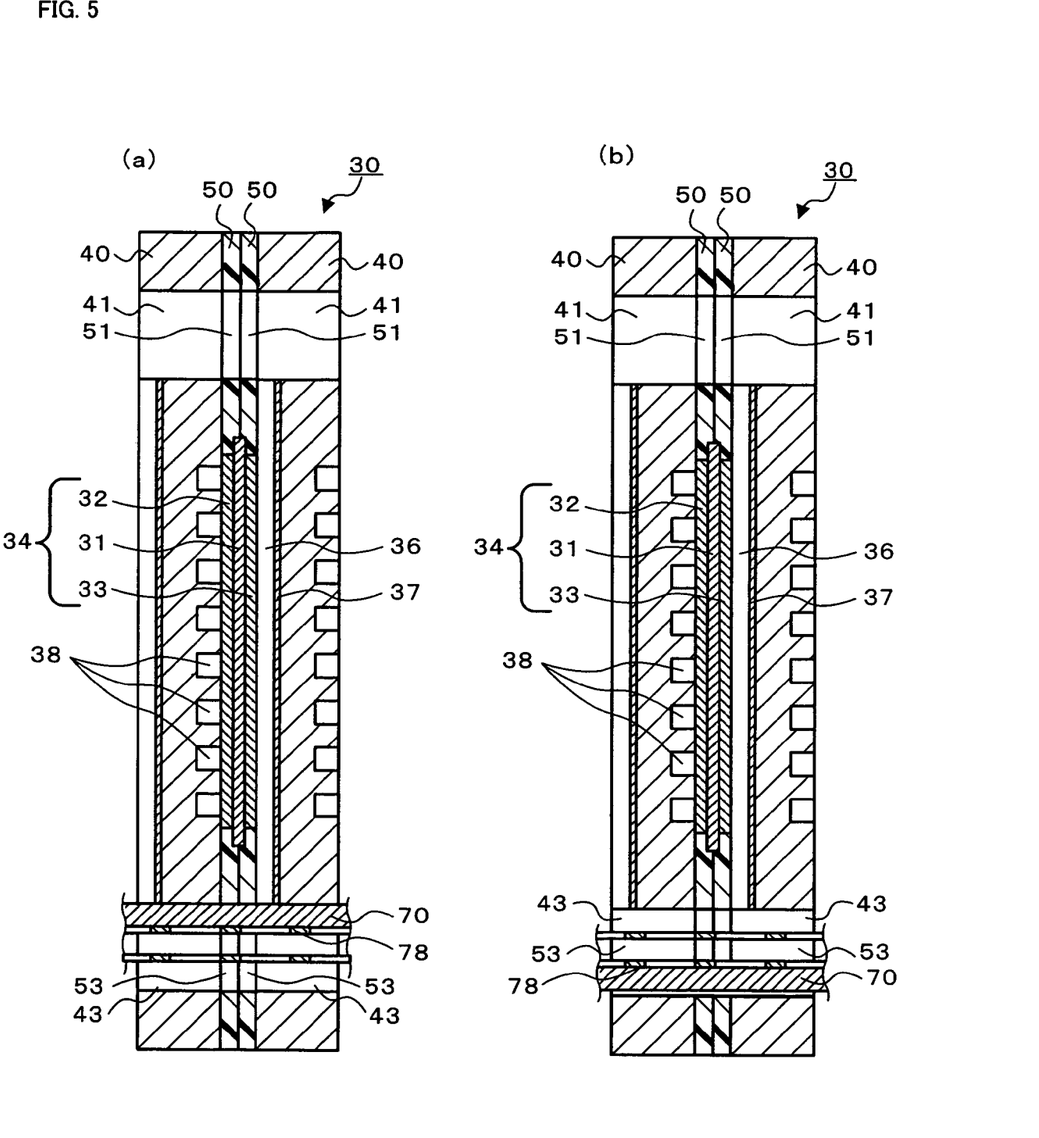
FIG. 5 is a sectional view showing the structure of the unit fuel cell.

One embodiment of the invention is discussed below with reference to the accompanied drawings. FIG. 1 schematically illustrates the construction of a vehicle 10 with a fuel cell system 12 mounted thereon. FIG. 2 is a decomposed perspective view showing the structure of a unit fuel cell 30. FIG. 3 is a perspective view schematically illustrating a changeover mechanism 72 of outer-conduit water absorbing members 70. FIG. 4 shows the positional relation between the outer-conduit water absorbing members 70 and oxidizing gas conduits 36. FIG. 5 is a sectional view showing the structure of the unit fuel cell 30.

As shown in FIG. 1, the vehicle 10 of this embodiment includes a fuel cell system 12, an actuation mechanism 14 that converts a supply of electric power from the fuel cell system 12 into driving force and rotates driving wheels 18, 18 via a reduction gear 16 with the driving force, and an electronic control unit 80 that controls the whole vehicle 10. The fuel cell system 12 has a fuel cell stack 20, which is a stack of multiple unit fuel cells 30 generating electric power through electrochemical reactions of hydrogen and oxygen, supply manifolds M1 and M2 to feed supplies of an oxidizing gas and a gaseous fuel to the respective unit fuel cells 30, and exhaust manifolds M3 and M4 to lead exhausts of the oxidizing gas and the gaseous fuel, which have passed through the respective unit fuel cells 30, out of the fuel cell stack 20. The fuel cell system 12 also includes outer-conduit water absorbing members 70 (see FIG. 3) that come into contact with and separate from outlets of oxidizing gas conduits 36 of the respective unit fuel cells 30 in the oxidizing gas exhaust manifold M3, and a changeover mechanism 72 (see FIG. 3) that changes over the status of the outer-conduit water absorbing members 70 between a contact state with the outlets of the respective oxidizing gas conduits 36 and a separate state from the outlets of the respective oxidizing gas conduits 36.

The fuel cell stack 20 is manufactured by stacking a plurality of the unit fuel cells 30 as base units and sequentially arranging a pair of collector plates 21 and 22, a pair of insulator plates 23 and 24, and a pair of end plates 25 and 26 on respective ends of the stack of the unit fuel cells 30. The collector plates 21 and 22 are composed of a gas-impermeable electric conductive material, such as dense carbon or copper. The insulator plates 23 and 24 are composed of an insulating material, such as rubber or resin. The end plates 25 and 26 are composed of a metal having rigidity, such as steel. The collector plates 21 and 22 respectively have output terminals 21a and 22a to output an electromotive force generated by the fuel cell stack 20. A holder mechanism (not shown) causes the end plates 25 and 26 to hold the respective unit cells 30 under pressure applied in its stacking direction.

As shown in FIGS. 2 and 5, each of the unit fuel cells 30 has a membrane electrode assembly (MEA) 34 including an anode 32 and a cathode 33 arranged across an electrolyte membrane 31, and a pair of separators 40, 40 disposed on both ends of the MEA 34. The electrolyte membrane 31 has good proton conductivity in its wet state. A Nafion membrane manufactured by DuPont is preferably applied for the electrolyte membrane 31. Each of the anode 32 and the cathode 33 has a catalyst electrode with platinum or an alloy of platinum and another metal carried thereon and a gas diffusion electrode of carbon cloth, which is a woven fabric of carbon fibers. The MEA 34 is obtained by integrating the anode 32, the electrolyte membrane 31, and the cathode 33 by thermo compression. Each of the separators 40 is composed of a gas-impermeable electric conductive material, for example, mold carbon obtained by compressing carbon to be gas impermeable. As shown in FIG. 2, an oxidizing gas supply port 41 and an oxidizing gas exhaust port 43 penetrating the separator 40 are formed on the approximate centers of an upper side and a lower side of the separator 40. A gaseous fuel supply port 42 and a gaseous fuel exhaust port 44 penetrating the separator 40 are also formed on the approximate centers of a left side and a right side of the separator 40. Circular apertures 45 through 48 penetrating the separator 40 for circulation of cooling water are also formed on four corners of the separator 40. Multiple grooves going from the oxidizing gas supply port 41 to the oxidizing gas exhaust port 43 form an oxidizing gas conduit 36 on one face of the separator 40. Similarly multiple grooves going from the gaseous fuel supply port 42 to the gaseous fuel exhaust port 44 form a gaseous fuel conduit 38 on the other face of the separator 40. The concaves of the multiple grooves and their surrounding walls defining the oxidizing gas conduit 36 are covered with an inner-conduit water holding material 37, which is composed of a woven fabric or a non-woven fabric of glass fibers, ceramic fibers, or other suitable fibers. The inner-conduit water holding material 37 takes advantage of the capillary phenomenon to absorb the moisture.

Gaskets 50 are interposed between the MEA 34 and the respective separators 40, as shown in FIG. 2. The gaskets 50 are arranged across the electrolyte membrane 31 to restrain leakage of the gaseous fuel and the oxidizing gas and to prevent the flow of the oxidizing gas from being mixed with the flow of the gaseous fuel in the space between the separators 40, 40. Each of the gaskets 50 has slots 51 through 54 perforated to face the oxidizing gas supply port 41, the gaseous fuel supply port 42, the oxidizing gas exhaust port 43, and the gaseous fuel exhaust port 44 of the separator 40 respectively, circular apertures 55 through 58 perforated to face the circular apertures 45 through 48 respectively (the circular aperture 55 is omitted from the illustration), and a square hole formed in a size to receive the anode 32 or the cathode 33 therein.

Among the supply manifolds, the oxidizing gas supply manifold M1 is a hollow space of connecting the oxidizing gas supply port 41 of the separator 40 with the slot 51 of the gasket 50 in the respective unit fuel cells 30 in the stacking direction of the fuel cell stack 20. A supply of the air as the oxidizing gas is fed from an air compressor 60 via a flow control valve 62, is humidified by a non-illustrated humidifier, and is flown into the oxidizing gas supply manifold Ml. The gaseous fuel supply manifold M2 is a hollow space of connecting the gaseous fuel supply port 42 of the separator 40 with the slot 52 of the gasket 50 in the respective unit fuel cells 30 in the stacking direction of the fuel cell stack 20. A supply of gaseous hydrogen as the gaseous fuel is fed from a hydrogen tank 64 via a flow control valve 66, is humidified by a non-illustrated humidifier, and is flown into the gaseous fuel supply manifold M2. Cooling water inflow manifolds M5 and M6 are respectively hollow spaces of connecting the circular apertures 45 and 46 of the separator 40 with the circular apertures 55 and 56 of the gasket 50 in the respective unit fuel cells 30 in the stacking direction of the fuel cell stack 20. A flow of cooling water as the coolant is fed from a non-illustrated pump and is flown into the cooling water inflow manifolds M5 and M6.

Among the exhaust manifolds, the oxidizing gas exhaust manifold M3 is a hollow space of connecting the oxidizing gas exhaust port 43 of the separator 40 with the slot 53 of the gasket 50 in the respective unit fuel cells 30 in the stacking direction of the fuel cell stack 20. The exhaust of the oxidizing gas, which has passed through the oxidizing gas conduits 36 of the respective unit fuel cells 30, is collectively led out of the fuel cell stack 20. The gaseous fuel exhaust manifold M4 is a hollow space of connecting the gaseous fuel exhaust port 44 of the separator 40 with the slot 54 of the gasket 50 in the respective unit fuel cells 30 in the stacking direction of the fuel cell stack 20. The exhaust of the gaseous fuel, which has passed through the gaseous fuel conduits 38 of the respective unit fuel cells 30, is collectively led out of the fuel cell stack 20. The exhaust of the gaseous fuel still includes non-reacted hydrogen and may thus be re-circulated into the gaseous fuel supply manifold M2. Cooling water outflow manifolds M7 and M8 are respectively hollow spaces of connecting the circular apertures 47 and 48 of the separator 40 with the circular apertures 57 and 58 of the gasket 50 in the respective unit fuel cells 30 in the stacking direction of the fuel cell stack 20. The hot flow of cooling water, which has passed through cooling water conduits formed in cooling water separators (not shown) disposed at intervals of several unit fuel cells 30 in the fuel cell stack 20, is collectively led out of the fuel cell stack 20. The hot flow of cooling water is cooled down by means of a non-illustrated radiator and is re-circulated into the cooling water inflow manifolds M5 and M6.

As shown in FIGS. 3 and 4, the outer-conduit water absorbing members 70 are composed of a woven fabric or a non-woven fabric of glass fibers, ceramic fibers, or any other suitable fibers and are extended in the stacking direction of the fuel cell stack 20. Like the inner-conduit water holding material 37, the outer-conduit water absorbing members 70 absorb the moisture by taking advantage of the capillary phenomenon. The outer-conduit water absorbing members 70 are designed to change over their positional relation to the oxidizing gas conduits 36 by means of the changeover mechanism 72. The changeover mechanism 72 includes a driving roller 74 and a driven roller 76 located on both ends in the oxidizing gas exhaust manifold M3 and a belt 78 spanned between these two rollers 74 and 76. The driving roller 74 is actuated and rotated by a stepping motor 79, which is attached to the outer face of the end plate 25 of the fuel cell stack 20. Gear rings (not shown) are set on the driving roller 74 and the driven roller 76. With rotations of the respective rollers 74 and 76, the teeth of the gear rings sequentially engage with guide apertures (not shown) formed in the belt 78 and thereby move the belt 78 in its rotating direction. There is accordingly no slippage of the belt 78 against the respective rollers 74 and 76. The belt 78 is a metal thin plate or a resin thin plate having a large number of punch holes perforated therein. An approximate half of the surface of the belt 78 is covered with the multiple outer-conduit water absorbing members 70, while the other approximate half of the surface of the belt 78 is not covered with the outer-conduit water absorbing members 70. When the belt 78 is rotated by means of the driving roller 74 to stop the covered portion of the belt 78 with the outer-conduit water absorbing members 70 at a position facing the outlets of the oxidizing gas conduits 36, the respective outer-conduit water absorbing members 70 come into contact with the outlets of the oxidizing gas conduits 36 (see FIG. 4(a)). When the belt 78 is rotated by means of the driving roller 74 to stop the uncovered portion of the belt 78 without the outer-conduit water absorbing members 70 at the position facing the outlets of the oxidizing gas conduits 36, on the other hand, the respective outer-conduit water absorbing members 70 separate from the outlets of the oxidizing gas conduits 36 (see FIG. 4(b)). Since the belt 78 has the large number of punch holes, there is not a significantly large pressure loss of the oxidizing gas passing through the oxidizing gas conduits 36, regardless of the stop position of the belt 78 with or without the outer-conduit water absorbing members 70.

The actuation mechanism 14 (see FIG. 1) has a power converter to convert the d.c. power generated by the fuel cell stack 20 into a.c. power and a traction motor driven and rotated with the converted a.c. power, although not being specifically illustrated.

Referring back to FIG. 1, the electronic control unit 80 is constructed as a microprocessor including a CPU 82, a ROM 84 that stores processing programs, a RAM 88 that temporarily stores data, and an input-output port (not shown). The electronic control unit 80 receives, as inputs via the input port, an accelerator pedal opening signal AP sent from an accelerator pedal sensor (not shown), a vehicle speed signal V sent from a vehicle speed sensor (not shown), and an input-output voltage signal of the power converter included in the actuation mechanism 14. The electronic control unit 80 outputs control signals to the stepping motor 79 and to the power converter and the traction motor included in the actuation mechanism 14 via the output port.

Figure 6:
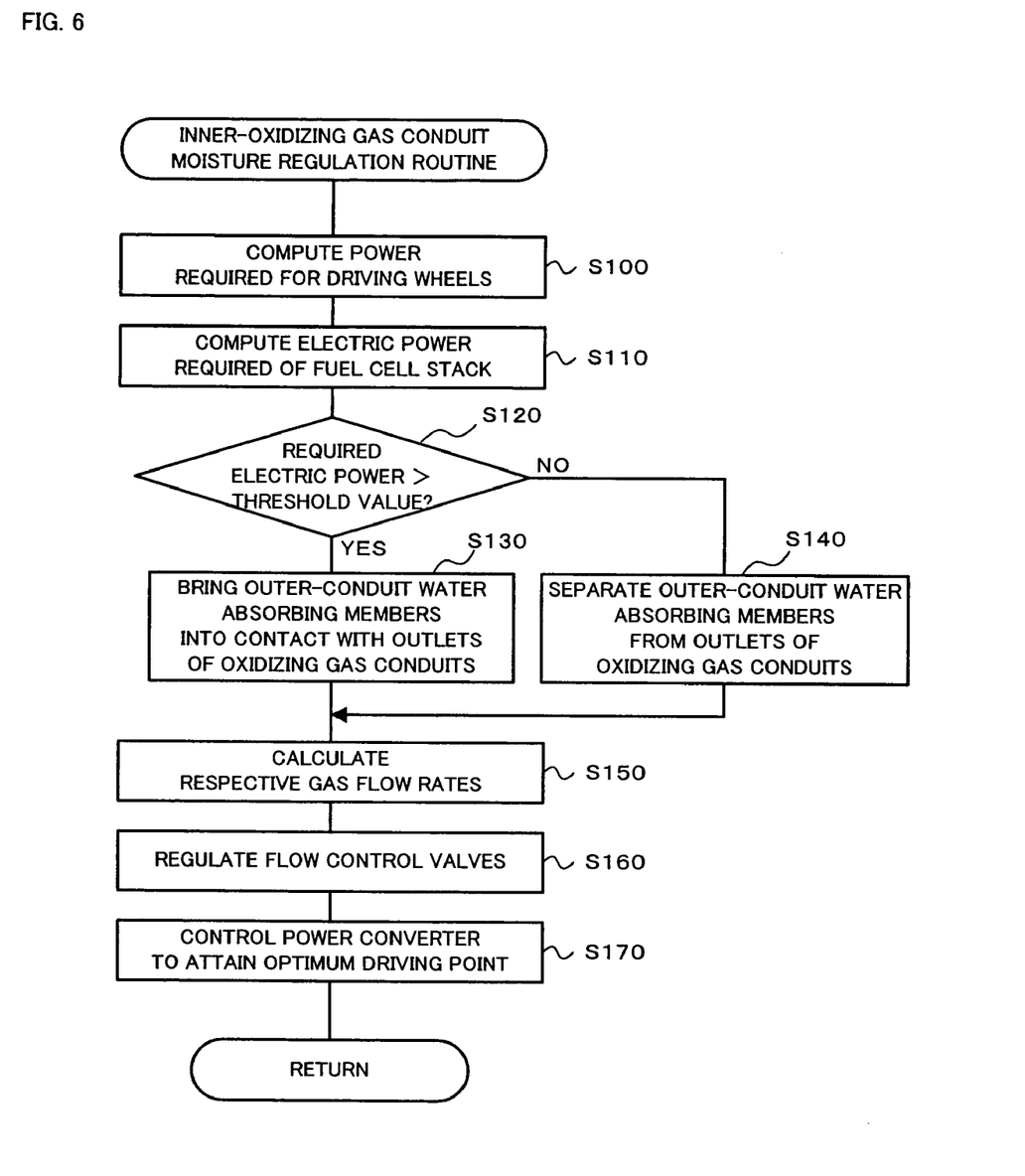
FIG. 6 is a flowchart showing an inner-oxidizing gas conduit moisture regulation routine.

The following describes the operations of the vehicle 10 of the embodiment constructed as discussed above, especially an operation of regulating the moisture level in the oxidizing gas conduits 36 while the vehicle 10 runs. FIG. 6 is a flowchart showing an inner-oxidizing gas conduit moisture regulation routine, which is executed by the CPU 82 of the electronic control unit 80. This routine is stored in the ROM 84 and is repeatedly executed by the CPU 82 at preset time intervals (for example, at every several msec). When the inner-oxidizing gas conduit moisture regulation routine starts, the CPU 82 first computes a power required for the driving wheels 18, 18 from the inputs of the current vehicle speed signal V and the current accelerator pedal opening signal AP, based on maps (not shown) stored in the ROM 84 (step S100). The CPU 82 subsequently computes an electric power required of the fuel cell stack 20 from the computed power (step S110). The computed electric power is then compared with a preset threshold value (step S120). The comparison of this step determines whether a high power is required for the fuel cell stack 20. Here the threshold value is empirically determined. The higher output of the fuel cell stack 20 leads to the vigorous electrochemical reactions, which produce a large quantity of water and make condensed water stay in the oxidizing gas conduits 36. The condensed water interferes with the smooth passage of the oxidizing gas. The procedure of the embodiment experimentally specifies the relation between the quantity of condensed water produced in the oxidizing gas conduits 36 and the output power of the fuel cell stack 20 and sets a specific value of the output power of the fuel cell stack 20 when the quantity of condensed water reaches an interference level of potentially interfering with the smooth flow of the oxidizing gas, to the threshold value.

When it is determined at step S120 that the required electric power is not greater than the preset threshold value, it is required to retain the moisture in the oxidizing gas conduits 36 and keep the favorable wet state of the electrolyte membrane 31. The CPU 82 accordingly controls the stepping motor 79 to make the respective outer-conduit water absorbing members 70 fixed on the surface of the belt 78 separate from the outlets of the oxidizing gas conduits 36 of the respective unit fuel cells 30 (step S140) (see FIGS. 4(b) and 5(b)). The inside of the oxidizing gas conduits 36 is highly humid, since the supply of the oxidizing gas flown into the oxidizing gas conduits 36 is humidified and the electrochemical reactions produce water on the cathode 33 during operations of the unit fuel cells 30. The inner-conduit water holding material 37 covering over the concaves of the grooves of the oxidizing gas conduits 36 and their surrounding walls retains the moisture. This functions to prevent production of condensed water and to keep the favorable wet state of the electrolyte membrane 31. There is accordingly no need of discharging the moisture from the oxidizing gas conduits 36. The outer-conduit water absorbing members 70 are thus kept separate from the outlets of the oxidizing gas conduits 36.

When it is determined at step S120 that the required electric power is greater than the preset threshold value, on the other hand, it is required to discharge the moisture from the oxidizing gas conduits 36. The CPU 82 accordingly controls the stepping motor 79 to bring the respective outer-conduit water absorbing members 70 fixed on the surface of the belt 78 into contact with the outlets of the oxidizing gas conduits 36 of the respective unit fuel cells 30 (step S130) (see FIGS. 4(a) and 4(b)). The higher level of the required electric power leads to the vigorous electrochemical reactions in the respective unit fuel cells 30, which produce a large quantity of water. The quantity of produced water may exceed the water holding capacity of the inner-conduit water holding material 37 to cause condensed water. The contact of the outer-conduit water absorbing members 70 arranged outside the unit fuel cells 30, that is, in the oxidizing gas exhaust manifold M3, with the outlets of the oxidizing gas conduits 36 covered with the inner-conduit water holding material 37 causes the moisture absorbed in the inner-conduit water holding material 37 to be transmitted to the outer-conduit water absorbing members 70 by taking advantage of the capillary phenomenon. This accordingly prevents condensed water from being produced in the oxidizing gas conduits 36. The moisture absorbed by the outer-conduit water absorbing members 70 is vaporized by the oxidizing gas passing through the oxidizing gas exhaust manifold M3 and is discharged from the fuel cell stack 20.

After the processing at either step S130 or step S140, the CPU 82 calculates an air flow rate to be flown into the oxidizing gas supply manifold M1 and a gaseous hydrogen flow rate to be flown into the gaseous fuel supply manifold M2, in order to allow the fuel cell stack 20 to generate the required electric power (step S150). The CPU 82 regulates the flow control valves 62 and 66 to make the actual air flow rate and the actual gaseous hydrogen flow rate substantially equal to the calculated flow rates (step S160). The CPU 82 refers to IV characteristics of the unit fuel cells 30 stored in the ROM 84, specifies an optimum driving point (current voltage value) to ensure generation of the currently required electric power for the unit fuel cells 30, and controls the power converter (not shown) of the actuation mechanism 14 to attain the specified optimum driving point and ensure output of the required power to the driving wheels 18, 18 (step S170). The CPU 82 then exits from this inner-oxidizing gas conduit moisture regulation routine.

As described above, the structure of the embodiment effectively regulates the removal and retention of the moisture from and in the oxidizing gas conduits 36 in the respective unit fuel cells 30 through the simple operations of bringing the outer-conduit water absorbing members 70 into contact with the outlets of the oxidizing gas conduits 36 and of separating the outer-conduit water absorbing members 70 from the outlets of the oxidizing gas conduits 36. This effectively keeps the favorable-wet state of the electrolyte membrane 31, which is closely related to the moisture level in the oxidizing gas conduits 36. While the outer-conduit water absorbing members 70 are separate from the oxidizing gas conduits 36, the inner-conduit water holding material 37 functions to retain the moisture in the oxidizing gas conduits 36. This effectively keeps the favorable wet state of the electrolyte membrane 31. While the outer-conduit water absorbing members 70 are in contact with the oxidizing gas conduits 36, on the other hand, the moisture in the oxidizing gas conduits 36 are discharged via the inner-conduit water holding material 37. This effectively prevents condensed water from being kept in the oxidizing gas conduits 36. Both the inner-conduit water holding material 37 and the outer-conduit water absorbing members 70 absorb the moisture by taking advantage of the capillary phenomenon, thus ensuring efficient absorption and discharge of the moisture. When the fuel cell stack 20 is operated at a high output level to produce a large quantity of water through the vigorous electrochemical reactions, the outer-conduit water absorbing members 70 are activated to remove the moisture from the oxidizing gas conduits 36. When the fuel cell stack 20 is operated at a relatively low output level to produce a little quantity of water through the electrochemical reactions, on the other hand, the outer-conduit water absorbing members 70 are inactivated to retain the moisture in the oxidizing gas conduits 36. This arrangement keeps the moisture in the oxidizing gas conduits 36 at an adequate level.

The embodiment discussed above is to be considered in all aspects as illustrative and not restrictive. There may be many modifications, changes, and alterations without departing from the scope or spirit of the main characteristics of the present invention.

Figure 7:
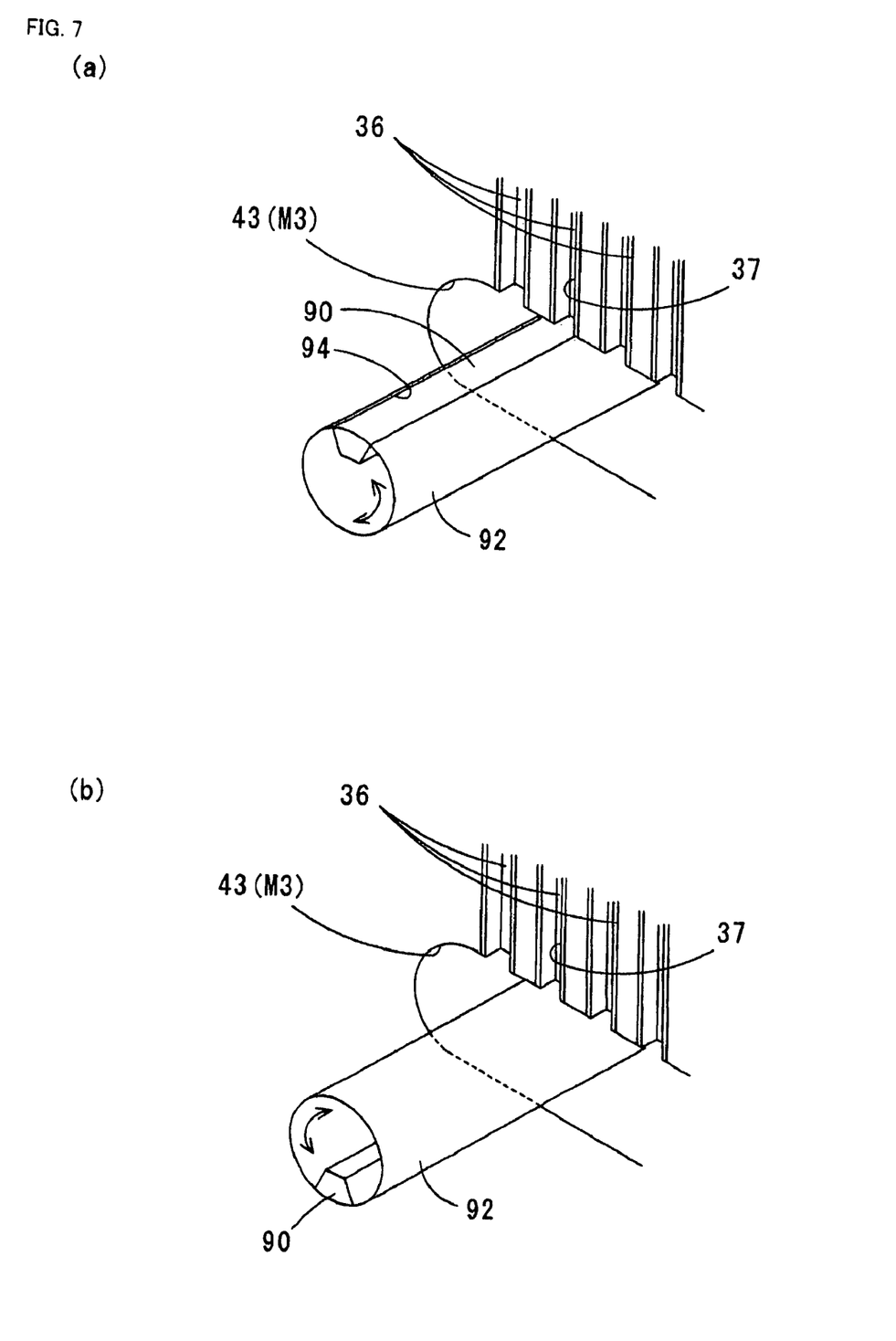
FIG. 7 and FIG. 8 are perspective views schematically illustrating a changeover mechanism in other embodiments.
Figure 8:
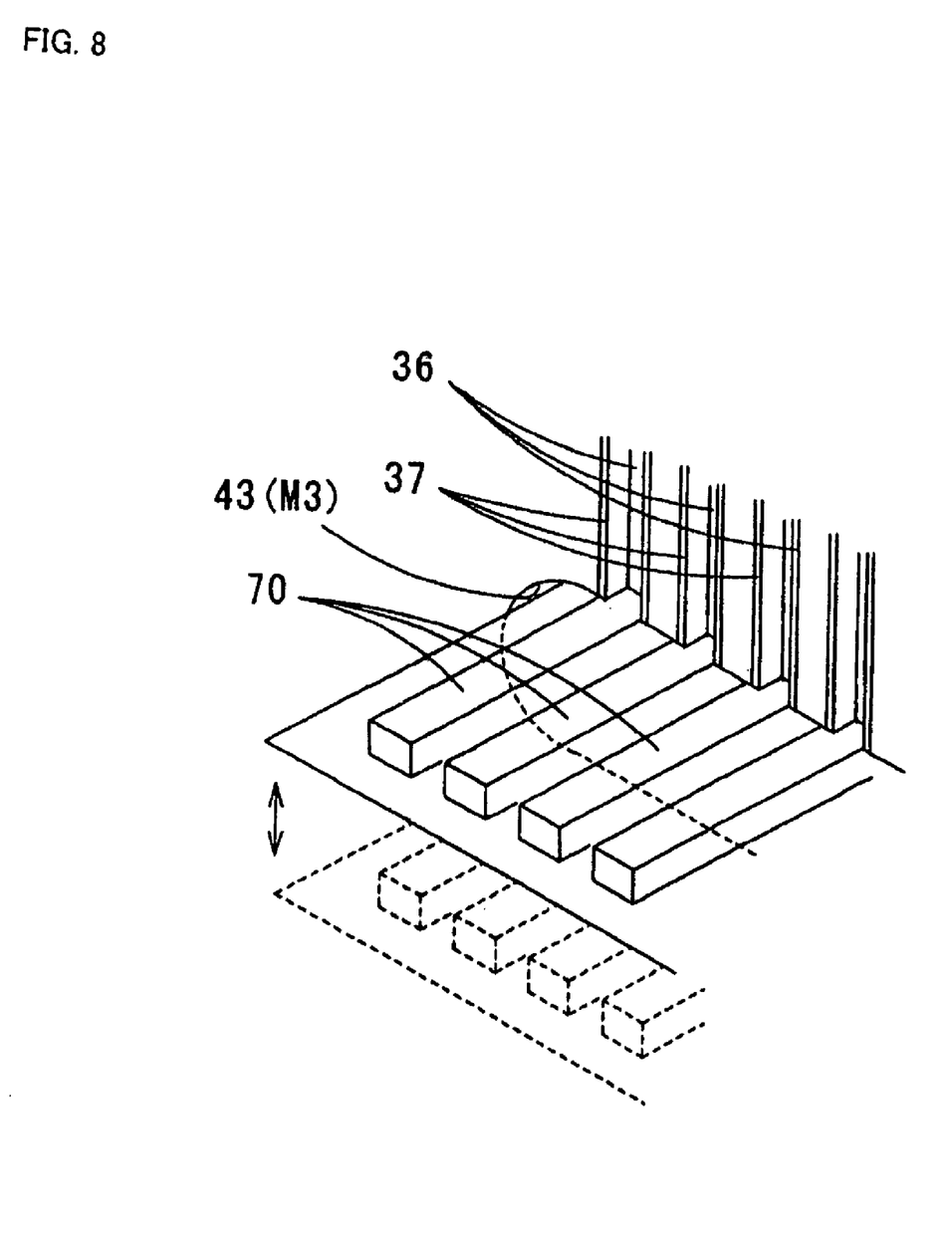

The structure of the embodiment adopts the changeover mechanism 72. In the changeover mechanism 72, the multiple outer-conduit water absorbing members 70 are fixed on the surface of the belt 78, which is spanned between the driving roller 74 and the driven roller 76. The stepping motor 79 drives and rotates the driving roller 74 to change over the status of the outer-conduit water absorbing members 70 between the contact state in which the outer-conduit water absorbing members 70 come into contact with the inner-conduit water holding material 37 and the separate state in which the outer-conduit water absorbing members 70 separate from the inner-conduit water holding material 37. In one modified structure shown in FIG. 7, a notched groove 94 is formed along an axis of a cylinder 92 that is composed of a metal thin plate or a resin thin plate and has a large number of punch holes perforated therein. An outer-conduit water absorbing member 90 is fit in the notched groove 94. An actuator (not shown), such as a stepping motor or a solenoid, is used to change over the status of the outer-conduit water absorbing member 90 between a contact state in which the outer-conduit water absorbing member 90 comes into contact with the outlets of the oxidizing gas conduits 36 covered with the inner-conduit water holding material 37 (see FIG. 7(a)) and a separate state in which the outer-conduit water absorbing member 90 separates from the outlets of the oxidizing gas conduits 36 covered with the inner-conduit water holding material 37 (see FIG. 7(b)). The outer-conduit water absorbing member 90 may be arranged corresponding to each groove of the oxidizing gas conduit 36 or corresponding to every several grooves of the oxidizing gas conduit 36. In another modified structure shown in FIG. 8, multiple outer-conduit water absorbing members 70 are fixed on the surface of a flat plate with a large number of punch holes perforated therein. The flat plate is moved vertically in the oxidizing gas exhaust manifold M3 to change over the status of the outer-conduit water absorbing members 70 between the contact state with the outlets of the oxidizing gas conduits 36 covered with the inner-conduit water holding material 37 and the separate state from the outlets of the oxidizing gas conduits 36 covered with the inner-conduit water holding material 37.

In the embodiment discussed above, the removal or the retention of the moisture in the oxidizing gas conduits 36 is changed over corresponding to the high output or the relatively low output of the fuel cell stack 20. One modified technique may determine whether there is an excess level of moisture or a relatively low level of moisture in the oxidizing gas conduits 36, in addition to or in place of the detection of the output level of the fuel cell stack 20. At the excess level of moisture in the oxidizing gas conduits 36, the modified structure brings the outer-conduit water absorbing members 70 into contact with the outlets of the oxidizing gas conduits 36 covered with the inner-conduit water holding material 37, so as to remove the moisture from the oxidizing gas conduits 36. At the relatively low level of moisture in the oxidizing gas conduits 36, the modified structure separates the outer-conduit water absorbing members 70 from the outlets of the oxidizing gas conduits 36 covered with the inner-conduit water holding material 37, so as to make the inner-conduit water holding material 37 retain the moisture in the oxidizing gas conduits 36. This arrangement enables the moisture in the oxidizing gas conduits 36 to be kept in an adequate range. One method applicable to determine the moisture level in the oxidizing gas conduits 36 uses voltage sensors attached to the respective unit fuel cells 30 for measuring their output voltages. The behavior of the output voltages at the excess level of moisture in the oxidizing gas conduits 36 is experimentally specified in advance. The determination of the moisture level depends upon the result of a comparison between the specified behavior and the current behavior of the output voltages from the respective unit cells 30.

The structure of the embodiment discussed above alternatively selects the contact state of the outer-conduit water absorbing members 70 with the outlets of the oxidizing gas conduits 36 or the separate state of the outer-conduit water absorbing members 70 from the outlets of the oxidizing gas conduits 36. One modified technique may regulate the effective contact area of the outer-conduit water absorbing members 70 with the outlets of the oxidizing gas conduits 36 in their contact state. One concrete procedure regulates the rotation of the stepping motor 79 to adjust the overlap between the outer-conduit water absorbing members 70 and the outlets of the oxidizing gas conduits 36 covered with the inner-conduit water holding material 37. For removal of a large quantity of moisture from the oxidizing gas conduits 36, the regulation increases the effective contact area of the outer-conduit water absorbing members 70 with the inner-conduit water holding material 37. For removal of a small quantity of moisture from the oxidizing gas conduits 36, on the contrary, the regulation decreases the effective contact area of the outer-conduit water absorbing members 70 with the inner-conduit water holding material 37. This modified technique ensures sensitive regulation of the moisture to be removed from the oxidizing gas conduits 36.

In the structure of the embodiment, the whole area of each oxidizing gas conduit 36 is covered with the inner-conduit water holding material 37. One possible modification may cover only a partial area of each oxidizing gas conduit 36 that is close to the outlet of the oxidizing gas conduit 36, that is, close to the oxidizing gas exhaust port 43, with the inner-conduit water holding material 37. The flow of oxidizing gas passing through the oxidizing gas conduits 36 and approaching to the oxidizing gas exhaust port 43 contains the water produced through the electrochemical reactions and often has an excess level of moisture, compared with the flow of oxidizing gas supplied through the oxidizing gas supply port 41 into the oxidizing gas conduits 36. The arrangement of the inner-conduit water holding material 37 close to the outlet of each oxidizing gas conduit 36 thus effectively functions to prevent production of condensed water.

In the structure of the embodiment, each of the oxidizing gas conduits 36 is formed to have multiple linear grooves going from the oxidizing gas supply port 41 to the oxidizing gas exhaust port 43. The oxidizing gas conduit 36 may have multiple curved grooves or a serpentine groove. Another possible structure may mount small cubes or small rectangular prisms at preset intervals on the surface of the separator 40 and set the gaps defined by the cubes or rectangular prisms as the oxidizing gas conduit 36.

In the embodiment discussed above, the fuel cell system 12 is mounted on the vehicle 10. The fuel cell system 12 may be mounted on any other vehicles and transportation machines like trains and aircraft, and may be incorporated in any cogeneration systems installed for domestic applications and industrial applications. In any case, the fuel cell system 12 and its applications exert the equivalent functions and effects to those discussed above.

What is claimed is:

1. A fuel cell system comprising a fuel cell that generates electric power through electrochemical reactions of oxygen included in an oxidizing gas, which passes through an oxidizing gas conduit provided on a cathode side of an electrolyte membrane in a wet state, and hydrogen included in a gaseous fuel, which passes through a gaseous fuel conduit provided on an anode side of the electrolyte membrane in the wet state, said fuel cell system further comprising:
   an outer-conduit water absorbing member that is disposed outside said oxidizing gas conduit and is capable of absorbing moisture; and
   a changeover module that changes over status of said outer-conduit water absorbing member between an absorption state, which brings said outer-conduit water absorbing member into direct contact with an outlet of said oxidizing gas conduit to make said outer-conduit water absorbing member absorb the moisture in said oxidizing gas conduit, and a non-absorption state, which physically separates said outer-conduit water absorbing member from the outlet of said oxidizing gas conduit to prevent said outer-conduit water absorbing member from absorbing the moisture in said oxidizing conduit.

2. A fuel cell system in accordance with claim 1, said fuel cell system further comprising:
   a changeover control module that controls said changeover module according to an operating state of said fuel cell.

3. A fuel cell system in accordance with claim 2, said fuel cell system further comprising:
   an operating state detection module that detects the operating state of said fuel cell,
   wherein said changeover control module controls said changeover module to bring said outer-conduit water absorbing member into contact with the outlet of said oxidizing gas conduit when said operating state detection module detects an excess level of the moisture in said oxidizing gas conduit, while controlling said changeover module to separate said outer-conduit water absorbing member from the outlet of said oxidizing gas conduit when said operating state detection module detects a relatively low level of the moisture in said oxidizing gas conduit.

4. A fuel cell system in accordance with claim 2, said fuel cell system further comprising:
   an operating state detection module that detects the operating state of said fuel cell,
   wherein said changeover control module controls said changeover module to bring said outer-conduit water absorbing member into contact with the outlet of said oxidizing gas conduit when said operating state detection module detects a high output level of said fuel cell, while controlling said changeover module to separate said outer-conduit water absorbing member from the outlet of said oxidizing gas conduit when said operating state detection module detects a relatively low output level of said fuel cell.

5. A fuel cell system in accordance with claim 1, wherein said changeover module regulates an effective contact area of said outer-conduit water absorbing member with the outlet of said oxidizing gas conduit.

6. A fuel cell system in accordance with claim 1, said fuel cell system further comprising:
   an inner-conduit water holding member that is disposed at least on a side of an outlet of said oxidizing gas conduit to absorb the moisture in said oxidizing gas conduit,
   wherein said outer-conduit water absorbing member comes into contact with the outlet of said oxidizing gas conduit and thereby with said inner-conduit water holding member, so as to absorb the moisture in said oxidizing gas conduit via said inner-conduit water holding member.

7. A fuel cell system in accordance with claim 6, wherein said inner-conduit water holding member absorbs the moisture by taking advantage of capillary phenomenon.

8. A fuel cell system in accordance with claim 1, wherein said outer-conduit water absorbing member absorbs the moisture by taking advantage of capillary phenomenon.

9. A fuel cell system in accordance with claim 1, said fuel cell system further comprising:
   a fuel cell stack comprising a plurality of said fuel cells laying one upon another; and
   an oxidizing gas exhaust manifold that joins respective outlets of oxidizing gas conduits formed in said plurality of fuel cells,
   wherein said outer-conduit water absorbing member is located in said oxidizing gas exhaust manifold.

10. A fuel cell system in accordance with claim 3, said fuel cell system further comprising:
    an inner-conduit water holding member that is disposed at least on a side of an outlet of said oxidizing gas conduit to absorb the moisture in said oxidizing gas conduit,
    wherein said outer-conduit water absorbing member comes into contact with the outlet of said oxidizing gas conduit and thereby with said inner-conduit water holding member, so as to absorb the moisture in said oxidizing gas conduit via said inner-conduit water holding member.

11. A fuel cell system in accordance with claim 10, wherein said inner-conduit water holding member and said outer-conduit water absorbing member absorb the moisture by taking advantage of capillary phenomenon.

12. A fuel cell system in accordance with claim 4, said fuel cell system further comprising:
    an inner-conduit water holding member that is disposed at least on a side of an outlet of said oxidizing gas conduit to absorb the moisture in said oxidizing gas conduit,
    wherein said outer-conduit water absorbing member comes into contact with the outlet of said oxidizing gas conduit and thereby with said inner-conduit water holding member, so as to absorb the moisture in said oxidizing gas conduit via said inner-conduit water holding member.

13. A fuel cell system in accordance with claim 12, wherein said inner-conduit water holding member and said outer-conduit water absorbing member absorb the moisture by taking advantage of capillary phenomenon.

14. A fuel cell system comprising a fuel cell that generates electric power through electrochemical reactions of an oxidizing gas and a gaseous fuel, which passes through respective gas conduits, said fuel cell system further comprising:
    an outer-conduit water absorbing member that is disposed outside at least one of said gas conduits, and is capable of absorbing moisture; and
    a changeover module that changes over status of said outer-conduit water absorbing member direct between an absorption state, which brings said outer-conduit water absorbing member into contact with an outlet of said at least one gas conduit to make said outer-conduit water absorbing member absorb the moisture in said at least one gas conduit, and a non-absorption state, which physically separates said outer-conduit water absorbing member from the outlet of said at least one gas conduit to prevent said outer-conduit water absorbing member from absorbing the moisture in said at least one gas conduit.

15. A vehicle with a fuel cell system mounted thereon, said fuel cell system comprising a fuel cell that generates electric power through electrochemical reactions of oxygen included in an oxidizing gas, which passes through an oxidizing gas conduit provided on a cathode side of an electrolyte membrane in a wet state, and hydrogen included in a gaseous fuel, which passes through a gaseous fuel conduit provided on an anode side of the electrolyte membrane in the wet state, said fuel cell system further comprising:
an outer-conduit water absorbing member that is disposed outside said oxidizing gas conduit, and is capable of absorbing moisture; and
a changeover module that changes over status of said outer-conduit water absorbing member between an absorption state, which brings said outer-conduit water absorbing member into direct contact with an outlet of said oxidizing gas conduit to make said outer-conduit water absorbing member absorb the moisture in said oxidizing gas conduit, and a non-absorption state, which physically separates said outer-conduit water absorbing member from the outlet of said oxidizing gas conduit to prevent said outer-conduit water absorbing member from absorbing the moisture in said oxidizing gas conduit.

16. A vehicle with a fuel cell system mounted thereon in accordance with claim 15, said fuel cell system further comprising:
changeover control module that controls said changeover module according to an operating state of said fuel cell.

17. A vehicle with a fuel cell system mounted thereon in accordance with claim 16, said fuel cell system further comprising:
an operating state detection module that detects the operating state of said fuel cell,
wherein said changeover control module controls said changeover module to bring said outer-conduit water absorbing member into contact with the outlet of said oxidizing gas conduit when said operating state detection module detects an excess level of the moisture in said oxidizing gas conduit, while controlling said changeover module to separate said outer-conduit water absorbing member from the outlet of said oxidizing gas conduit when said operating state detection module detects a relatively low level of the moisture in said oxidizing gas conduit.

18. A vehicle with a fuel cell system mounted thereon in accordance with claim 16, said fuel cell system further comprising:
an operating state detection module that detects the operating state of said fuel cell,
wherein said changeover control module controls said changeover module to bring said outer-conduit water absorbing member into contact with the outlet of said oxidizing gas conduit when said operating state detection module detects a high output level of said fuel cell, while controlling said changeover module to separate said outer-conduit water absorbing member from the outlet of said oxidizing gas conduit when said operating state detection module detects a relatively low output level of said fuel cell.

19. A vehicle with a fuel cell system mounted thereon in accordance with claim 15, said fuel cell system further comprising:
an inner-conduit water holding member that is disposed at least on a side of an outlet of said oxidizing gas conduit to absorb the moisture in said oxidizing gas conduit,
wherein said outer-conduit water absorbing member comes into contact with the outlet of said oxidizing gas conduit and thereby with said inner-conduit water holding member, so as to absorb the moisture in said oxidizing gas conduit via said inner-conduit water holding member.

20. A vehicle with a fuel cell system mounted thereon, said fuel cell system comprising a fuel cell that generates electric power through electrochemical reactions of an oxidizing gas and a gaseous fuel, which passes through respective gas conduits,
said fuel cell system further comprising:
an outer-conduit water absorbing member that is disposed outside at least one of said gas conduits, and is capable of absorbing moisture; and
a changeover module that changes over status of said outer-conduit water absorbing member between an absorption state, which brings said outer-conduit water absorbing member into direct contact with an outlet of said at least one gas conduit to make said outer-conduit water absorbing member absorb the moisture in said at least one gas conduit, and a non-absorption state, which physically separates said outer-conduit water absorbing member from the outlet of said at least one gas conduit to prevent said outer-conduit water absorbing member from absorbing the moisture in said at least one gas conduit.

* * * * *

UNITED STATES PATENT AND TRADEMARK OFFICE
CERTIFICATE OF CORRECTION

PATENT NO. : 7,175,933 B2
APPLICATION NO. : 10/777659
DATED : February 13, 2007
INVENTOR(S) : Nakanishi et al.

It is certified that error appears in the above-identified patent and that said Letters Patent is hereby corrected as shown below:

| Column | Line | |
|---|---|---|
| 8 | 45 | Change "favorable-wet" to --favorable wet--. |
| 12 | 67 | After "member" delete "direct". |
| 13 | 2 | Before "contact" insert --direct--. |

Signed and Sealed this

Seventh Day of August, 2007

JON W. DUDAS
*Director of the United States Patent and Trademark Office*